United States Patent [19]

Morimoto

[11] 4,289,283
[45] Sep. 15, 1981

[54] LEG AND SADDLE OF FISHING REEL

[75] Inventor: Yoshinori Morimoto, Fuchu, Japan

[73] Assignee: Ryobi Ltd., Fuchu, Japan

[21] Appl. No.: 74,621

[22] Filed: Sep. 12, 1979

[30] Foreign Application Priority Data

Oct. 16, 1978 [JP] Japan .............................. 53-142406[U]

[51] Int. Cl.³ ............................................ A01K 89/01
[52] U.S. Cl. ................................... 242/84.2 R; 43/22
[58] Field of Search .................... 242/84.1 R, 84.2 R, 242/84.21 R, 84.2 G; 43/20, 22

[56] References Cited

U.S. PATENT DOCUMENTS 2,799,457  7/1957  Martini ......................... 242/84.21 R
4,156,510  5/1979  Hull ............................... 242/84.1 R

*Primary Examiner*—Billy S. Taylor
*Attorney, Agent, or Firm*—Sughrue, Mion, Zinn, Macpeak & Seas

[57] ABSTRACT

A fishing reel leg and saddle both integrally connected to a main reel body for mounting a fishing reel on a fishing rod. The leg disposes a reinforcing member along its central axis. The reinforcing member is formed by preimpregnation of carbon fibers and/or glass fibers, both fibers being directed along the longitudinal direction of the resultant reinforcing member.

11 Claims, 7 Drawing Figures

LEG AND SADDLE OF FISHING REEL

BACKGROUND OF THE INVENTION

This invention relates to a fishing reel leg and saddle for mounting a fishing reel body on a fishing rod.

According to the several types of conventional fishing reels, a main reel body and a reel leg and saddle are formed of synthetic resin and are integrally formed with each other in order to provide light and compact reel device and to enhance productivity. However, such fishing reel made of synthetic resin does not provide sufficient mechanical strength, so that the reel device, particularly, the reel leg and saddle portions may be easily damaged or broken. Therefore, demand has been made to produce light and compact reel device, yet providing sufficient mechanical strength.

SUMMARY OF THE INVENTION

It is therefore, an object of this invention to overcome the above-mentioned drawback and to provide an improved fishing reel.

Another object of this invention is to provide light and compact fishing reel which has a reel leg and saddle portions having sufficient mechanical strength within high-rate-production.

The object is attained in accordance with this invention by providing a reinforcing member centrally disposed in the reel leg. The reinforcing member is the member having high resiliency and high mechanical strength, and is formed by preimpregnation of carbon fibers and/or glass fibers, those fibers being directed along the longitudinal direction of the resultant reinforcing member.

This invention will be described with reference to the accompanying drawings and the description of the preferred embodiment.

DETAILED DESCRIPTION OF THE INVENTION

Figure 1:
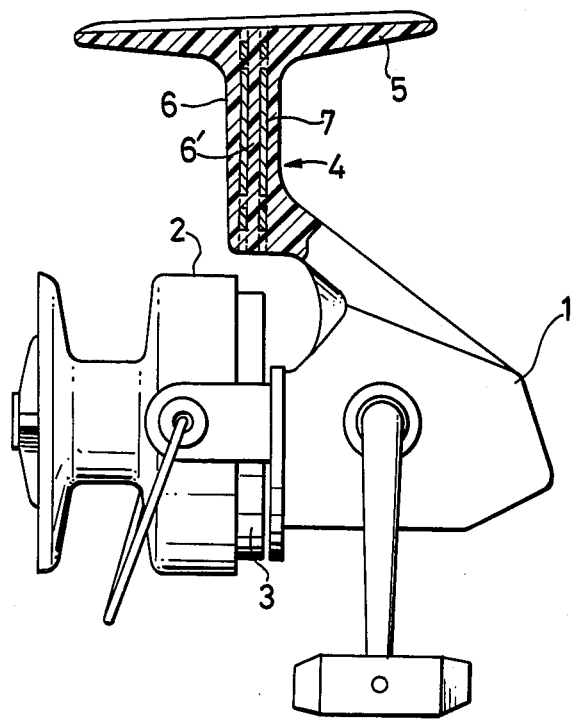
FIG. 1 is a side view of a fishing reel including a partial cross-sectional view to show essential part of this invention.

Referring now to the drawings, and initially to FIG. 1, a reel attaching portion 4 and a main reel body 1 which supports a spool 2 and a rotor 3 are integrally formed of synthetic resin material containing carbon and glass materials which provide relatively high mechanical strength. The reel attaching portion 4 consists of a saddle 5 to be engaged with a fishing rod (not shown) and a leg 6 extending between the saddle 5 and the main reel body 1. A reinforcing member 7 is inserted in the leg portion 6 during molding. The reinforcing member 7 is formed by preimpregnation of carbon fibers or glass fibers or a mixture thereof, those fibers being directed along the longitudinal direction of the resultant reinforcing member.

Figure 2:
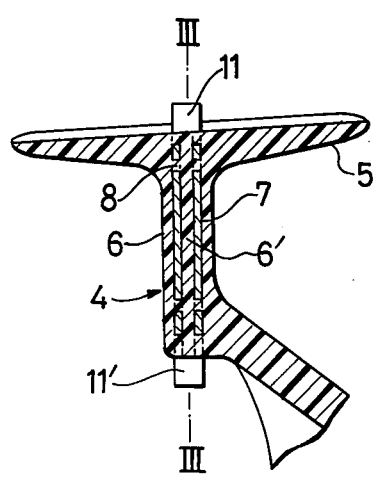
FIG. 2 is a cross-sectional view of a reel leg and saddle portions according to this invention.
Figure 3:
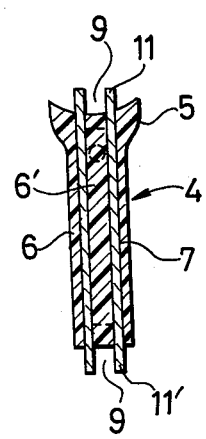
FIG. 3 is a cross-sectional view taken along the line III—III of FIG. 2.
Figure 4A:
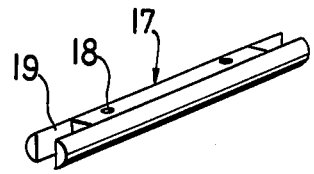
FIGS. 4(a) to 4(d) are perspective views showing several modifications of reinforcing members according to this invention.
Figure 4B:
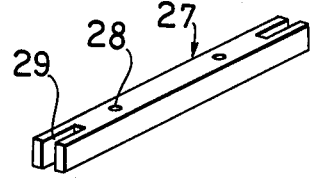
Figure 4C:
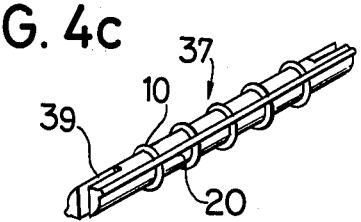
Figure 4D:
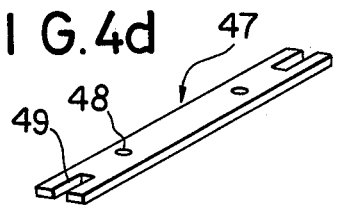

The reinforcing member 7 is in the form of tubular shape as shown in FIGS. 2 and 3, or of solid rod having rectangular or circular cross-section as shown in FIGS. 4(a) to 4(c), or of plate shape as shown in FIG. 4(d). In order to enhance bonding strength of the member 7 with a synthetic resin portion 6' of the leg portion 6, the reinforcing member 7 is formed with perforations 8 and/or kerfs 9 formed at both ends thereof.

As shown in FIG. 4a, the reinforcing member 17 is formed of a solid rod having a truncated circular cross-section. Perforations 18 and kerfs 19 are formed in the solid rod for purposes of enhancing the bonding strength of the reinforcing element 17 with the resin portion. Alternatively, as shown in FIG. 4b, the reinforcing member 27 may be formed of a generally rectangular cross-section having perforations 28 and kerf portions 29.

Additional alternative embodiments are shown in FIGS. 4c and 4d. As shown in FIG. 4c, projections 10 and 20 extend over the surface of the reinforcing element 37. Projections 10 are generally circular extending circumferentially about the reinforcing member at spaced intervals with projections 20 extending longitudinally over the surface. In FIGS. 4d, the reinforcing element 47 is shown as a plate-shape again having perforations 48 and/or kerfs 49.

In producing the reel attaching portion 4, the reinforcing member 7 is prepared to have an axial length slightly larger than that of the reel attaching portion as shown in FIG. 2. Both surplus ends 11,11' of the reinforcing member 7 are supported by metal molds (not shown) so as to centrally dispose the member 7 in the leg portion 6, during which the reel attaching portion 4 and the main body 1 are integrally molded. Upon completion of the molding, the surplus ends 11,11' are cut so that the both ends of the reinforcing member 7 are flush with the surface of the saddle 5 and the leg, respectively.

The reinforcing members thus provided serve to reinforce the reel attaching portion because of its high resiliency and high mechanical strength, and therefore, accidental brakage of the reel attaching portion, particularly the reel leg is prevented. Further, such reel device is light and compact in comparison with the reel devices those produced by metal framing. Furthermore, since conventional molding unit is usable to provide the reinforcing member in the leg portion, ecconimical production can be realized.

While the invention has been described in detail and with reference to specific embodiment thereof, it will be apparent to one skilled in the art that various changes and modifications can be made therein without departing from the spirit and scope thereof.

What is claimed is:

1. In a fishing reel including a main reel body for supporting a spool and a rotor, and a reel mounting member which consists of a saddle portion and a leg portion extending between the saddle and the main reel body, said main reel body and said reel mounting member being integrally formed by synthetic resin, the improvement comprising; a reinforcing member centrally disposed in said leg portion, said reinforcing member being formed by preimpregnation of fibers which direct along the longitudinal direction thereof.

2. The improvement of claim 1, wherein said fibers are carbon fibers.

3. The improvement of claim 1, wherein said fibers are glass fibers.

4. The improvement of claim 1, wherein said fibers are a mixture of carbon and glass fibers.

5. The improvement of claims 1, 2, 3 or 4, wherein said reinforcing member has circular cross-section.

6. The improvement of claims 1, 2, 3 or 4, wherein said reinforcing member has rectangular cross-section.

7. The improvement of claims 1, 2, 3 or 4, wherein said reinforcing member is tubular form.

8. The improvement of claims 1, 2, 3 or 4, wherein said reinforcing member is formed with at least one perforation.

9. The improvement of claim 8, wherein said reinforcing member is formed with kerfs at both ends thereof.

10. The improvement of claims 1, 2, 3 or 4, wherein said reinforcing member is formed with projections at an outer peripheral surface thereof.

11. The improvement of claim 1, wherein said reinforcing member is formed with kerfs at both ends thereof.

* * * * *